(12) United States Patent
Durand

(10) Patent No.: US 7,384,142 B2
(45) Date of Patent: Jun. 10, 2008

(54) RIMLOCK FOR EYEGLASSES

(75) Inventor: Jacques Durand, Limoges (FR)

(73) Assignee: Chic Optic Inc., Montreal (CA)

( * ) Notice: Subject to any disclaimer, the term of this patent is extended or adjusted under 35 U.S.C. 154(b) by 104 days.

(21) Appl. No.: 11/338,880

(22) Filed: Jan. 25, 2006

(65) Prior Publication Data

US 2006/0268219 A1    Nov. 30, 2006

Related U.S. Application Data

(60) Provisional application No. 60/646,526, filed on Jan. 25, 2005.

(51) Int. Cl.
*G02C 1/08* (2006.01)
*G02C 5/00* (2006.01)
(52) U.S. Cl. .......................... 351/90; 351/95; 351/149; 351/152
(58) Field of Classification Search .......... 351/90–102, 351/147, 149–152, 41
See application file for complete search history.

(56) References Cited

U.S. PATENT DOCUMENTS

| 2,921,500 | A |   | 1/1960  | Gell          |        |
|-----------|---|---|---------|---------------|--------|
| 3,473,869 | A |   | 10/1969 | Plutznik et al. |      |
| 4,277,151 | A | * | 7/1981  | Schonhut      | 351/41 |
| 4,360,252 | A |   | 11/1982 | Solomon       |        |
| 4,363,537 | A |   | 12/1982 | Burton        |        |
| 4,725,132 | A |   | 2/1988  | Pivetta       |        |
| 4,813,775 | A |   | 3/1989  | Kaksonen      |        |
| 6,338,556 | B1|   | 1/2002  | Kamiya        |        |

FOREIGN PATENT DOCUMENTS

| EP | 0246688 | * | 11/1987 | .................. 351/90 |

* cited by examiner

*Primary Examiner*—Huy Mai

(57) ABSTRACT

A rimlock for use with an eyeglass frame is provided. The rimlock comprises a pair of flanges which protrude from the frame at a split therein. A spring is fed through a bore passing through the flanges whereby a portion of the spring internal to the rimlock at a widened portion of the bore is in tension thereby biasing the flanges into engagement allowing the frame to hold a lens in position within the frame. By pulling the flanges apart, the lens can be removed.

7 Claims, 4 Drawing Sheets

RIMLOCK FOR EYEGLASSES

This application claims priority from U.S. Provisional Patent Application No. 60/646,526 filed on Jan. 25, 2005.

FIELD OF THE INVENTION

The present invention relates to the field of eyeglasses.

DESCRIPTION OF THE PRIOR ART

Eyeglasses typically provide a pair of lenses, prescriptive and/or protective, that are supported on a user. The support includes a pair of temples that extend rearwardly from the lens and engage the ears of the user. Further support is provided by a bridge that extends between the lenses and engage on the nose of the user. In this way, a stable support for the lens is provided which may be adjusted to suit particular needs of the user.

The temples and bridge may form part of a frame that also provides a support for the lens. In this arrangement, the frame will extend about the lens to define a lens opening that holds the lens in the required position. The frame surrounding the lens opening may be designed for aesthetic appeal or may be relatively unobtrusive when formed from a transparent material or thin member.

For securing the lens into position, the frame will typically incorporate a clamp at some point along the perimeter of the frame, or a thin transparent band holding the lens against the frame. In most cases, in particular when using a clamp, it is common to have a break in the frame at or around an end-piece connecting the temple to the frame. A flange provides a mating surface to engage the end-piece and a screw or other fastener is used to secure the clamp and in turn hold the lens in place.

Whilst a clamp secured with a screw is adequate in holding the lens in place, there are several drawbacks common to mechanical connections using a screw. It is well known that eyeglasses which are connected using screws require tightening on occasion as well as specialized screwdrivers to properly tighten the screw without stripping the head. Repeated tightening, even with a proper screwdriver, eventually leads to stripping and increases the chance of losing the screw. Moreover, due to its size, the screw is difficult to replace and therefore changing lenses and even tightening the frame is avoided unless absolutely necessary.

It is therefore an object of the present invention to provide eyeglasses in which the above disadvantages are obviated or mitigated.

SUMMARY OF THE INVENTION

A lens clamping device for an eyeglass frame for holding a lens in place with the frame, the device comprising a pair of abutments on opposite sides of a discontinuity of the frame, the abutments having a bore passing therethrough. The abutments are biased into engagement by a spring located in the bore wherein a portion of the spring within the bore is in tension to bias the abutments into engagement. The spring permits the lens to be removed by separation of the abutments.

BRIEF DESCRIPTION OF THE DRAWINGS

An embodiment of the invention will now be described by way of example only with reference to the appended drawings wherein.

DETAILED DESCRIPTION OF THE INVENTION

Figure 1:
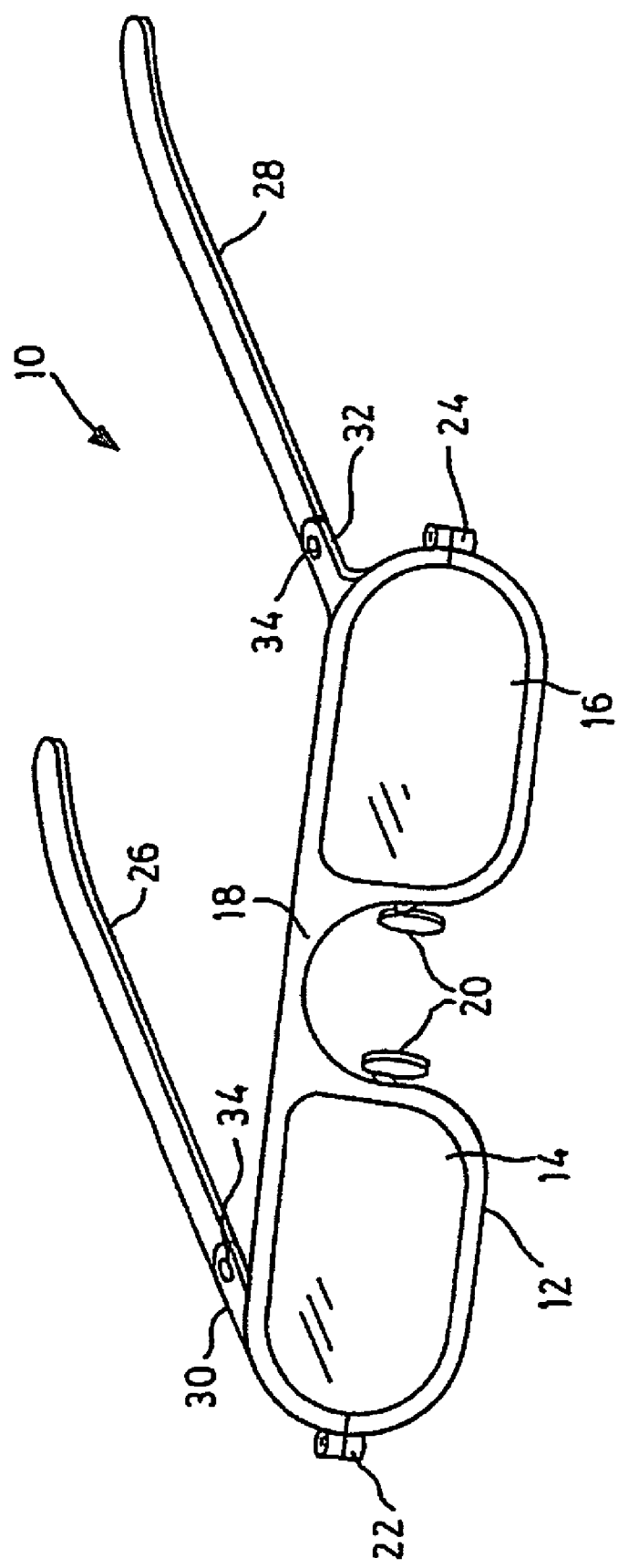
FIG. 1 is a perspective view of an eyeglass.

Referring therefore to FIG. 1, an eyeglass is generally denoted by numeral 10. The eyeglass 10 comprises a frame 12 which holds a pair of lenses 14, 16 in their respective positions. The frame 12 comprises a substantially centrally located bridge 18 to separate the lenses 14, 16 a desired distance in order to position the lenses 14, 16 in front of the eyes of a user of the eyeglass 10. Below the bridge 18 and laterally attached to the frame 12 are nose pieces 20 for engaging the nose of the user. The nose pieces 20 are a well known eyeglass component and therefore further detail of its individual components will be omitted.

Further support to the user is provided by a pair of temples 26, 28 which are connected to the frame 12 at respective end-pieces 30, 32. The temples 26, 28 are connected to the end-pieces 30, 32 at respective hinges using a screw 34 thereby allowing the temples 26, 28 to pivot with respect to the frame 12 for storage purposes.

The frame 12 also comprises a pair of lens clamping devices 22 and 24, hereinafter referred to as a "rimlock". A first rimlock 22 is used for holding a first lens 14 in place and a second rimlock 24 is used for holding a second lens 16 in place. It will be appreciated that the rimlocks 22, 24 may be located at any convenient point along the perimeter of the frame 12 provided that a rimlock 22, 24 is used to clamp each lens 14, 16 respectively.

Figure 2:
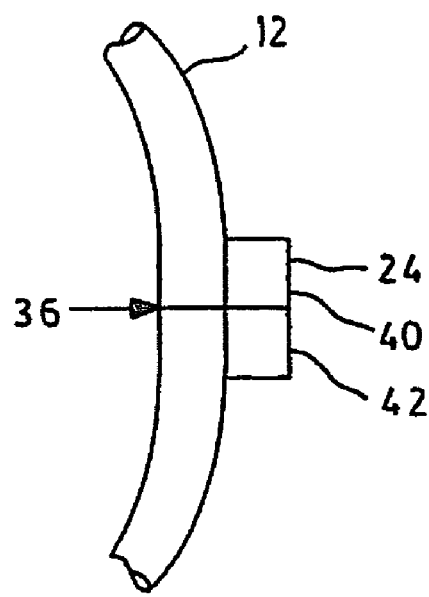
FIG. 2 is an enlarged front view of a rimlock of the eyeglass of FIG. 1.
Figure 3:
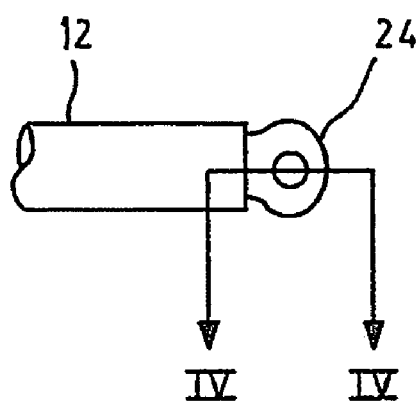
FIG. 3 is a top view of the rimlock of FIG. 2.
Figure 4:
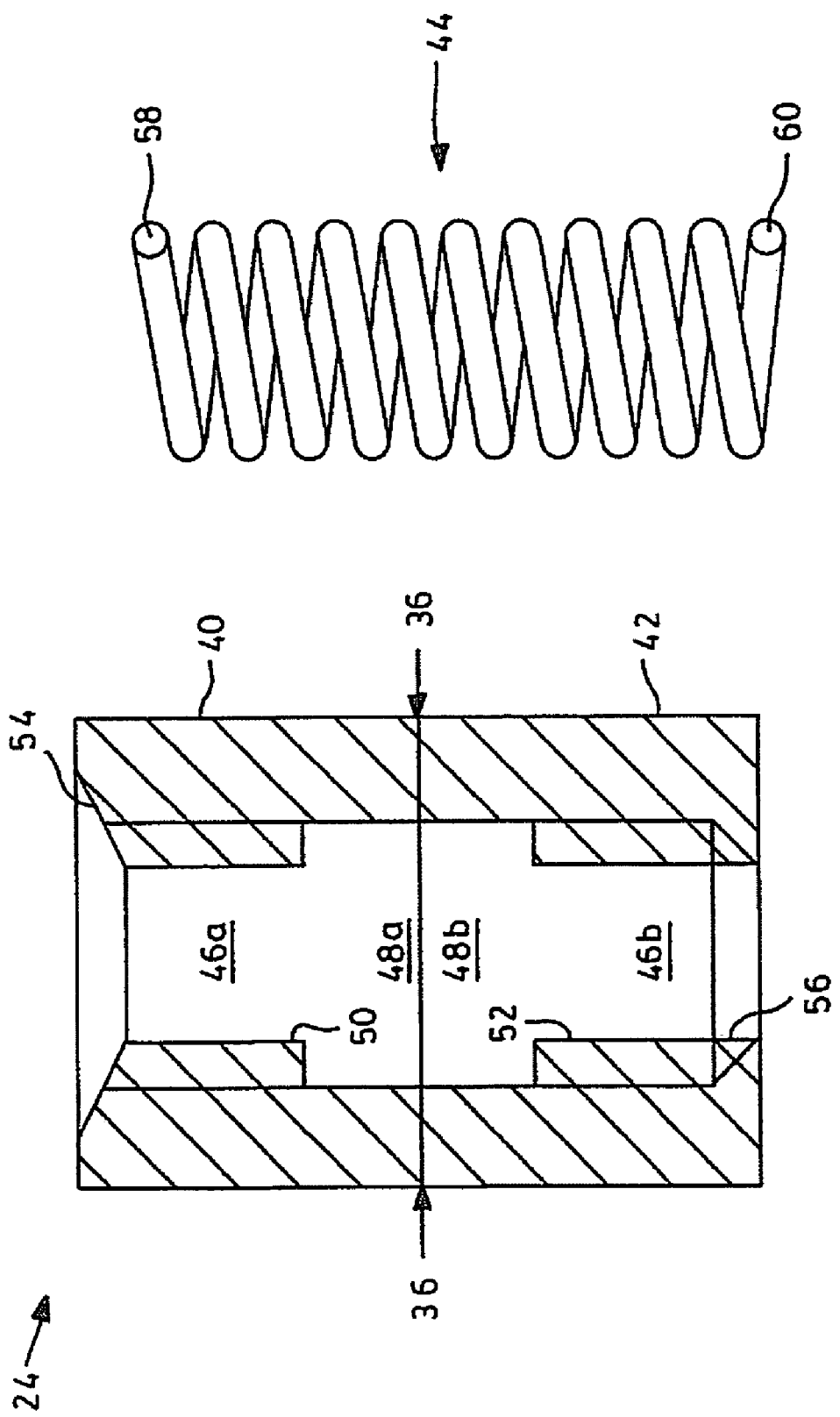
FIG. 4 is a sectional view along the line IV-IV of FIG. 3.

An enlarged view of the second rimlock 24 is shown in FIGS. 2 and 3. The side-view shown in FIG. 2 illustrates that the frame 12 is split along a plane passing therethrough at a line denoted by numeral 36 providing a surface at which an upper abutment 40 and a lower abutment 42 of the second rimlock 24 engage one another. The top-view shown in FIG. 3 illustrates that the second rimlock 24 preferably extends outwardly from the frame 12. The rimlock 24 is therefore in connection with the frame 12 at a discontinuity therein, and through the engagement of its upper abutment 40 and lower abutment 42, the frame 12 is biased into its desired configuration whereby the second lens 16 (not shown) is held securely in place. FIG. 4 shows an enlarged view of the second rimlock 24 in section along the line IV-IV of FIG. 3.

Referring therefore to FIG. 4, the second rimlock 24 is shown in isolation from the frame 12 in section and unassembled. It is apparent from FIG. 4 that the second rimlock 24 may attach to the frame 12 at either side and therefore is representative of the structure and function of the first rimlock 22. The second rimlock 24 is comprised of the upper abutment 40, the lower abutment 42 and a helical spring 44. The upper abutment 40 and lower abutment 42, when assembled, engage each other at plane 36 and each abutment 40, 42 embodies a flange protruding from the frame 12 whereby engagement of the abutments 40, 42 subsequently encloses the second lens 16 (not shown) within the frame 12.

Each of the upper abutment 40 and lower abutment 42 have smaller diameter bores 46a, 46b respectively and larger diameter bores 48a, 48b respectively. The larger diameter bores 48a, 48b extend from the lower end of the respective abutment 40, 42 to a depth of approximately ⅓ of the axial length of the abutment 40, 42. At the interface of the smaller bores 46a, 46b and the larger bores 48a, 48b, respective steps 50, 52 are thus created which are essentially circumferential collars of material, having a thickness equal to the difference in radius of the larger bores 48a, 48b and the smaller bores 46a, 46b.

In this example at the uppermost end of smaller bore 46a (i.e. the end opposite that of the interface between the smaller bore 46a and larger bore 48a), a bevel 54 is preferably cut around the circumference of the smaller bore 46a, creating an inwardly sloping surface extending from a radius greater than the smaller bore 46a at an downward angle relative to the upper surface of the upper abutment and terminates upon reaching the smaller bore 46a. At the lowermost end of the smaller bore 46b (i.e. the end opposite that of the interface between the smaller bore 46b and larger bore 48b) an internal bevel 56 is cut extending outward from the smaller bore 46b cutting through the step 52 to a depth equal to that of radius of the large bore 48b.

The bores are arranged with the larger bores 48a and 48b adjacent and the smaller bores 46a and 46b remote. The upper abutment 40 and the lower abutment 42 are preferably equal in axial length as shown in FIG. 4 and therefore the rimlock's length would be divided 50/50 at line 36. The total length of the rimlocks 22, 24 is preferably within the range of 3 mm to 10 mm and is most preferably in the range of 3 mm to 4 mm.

The spring 44 having upper and lower ends 58, 60 is located in the bores and dimensioned in a free body state to have a diameter less than that of the larger bore 48 but greater in diameter than that of the smaller bore 46. Preferably, the spring's diameter is at least 1/10 less in diameter than that of the larger bore 48. The spring's length is preferably, at a maximum, 8/10 the length of the rimlock 22, 24. When assembled, as described below, the spring 44 applies a tension to the abutments 40, 42.

The rimlock 24 is assembled with the upper abutment 40 and the lower abutment 42 first engaged prior to insertion of the spring 44. FIGS. 5a through 5e illustrate the manner in which the spring 44 is threaded into the abutments 40, 42 to maintain engagement therebetween.

Figure 5:
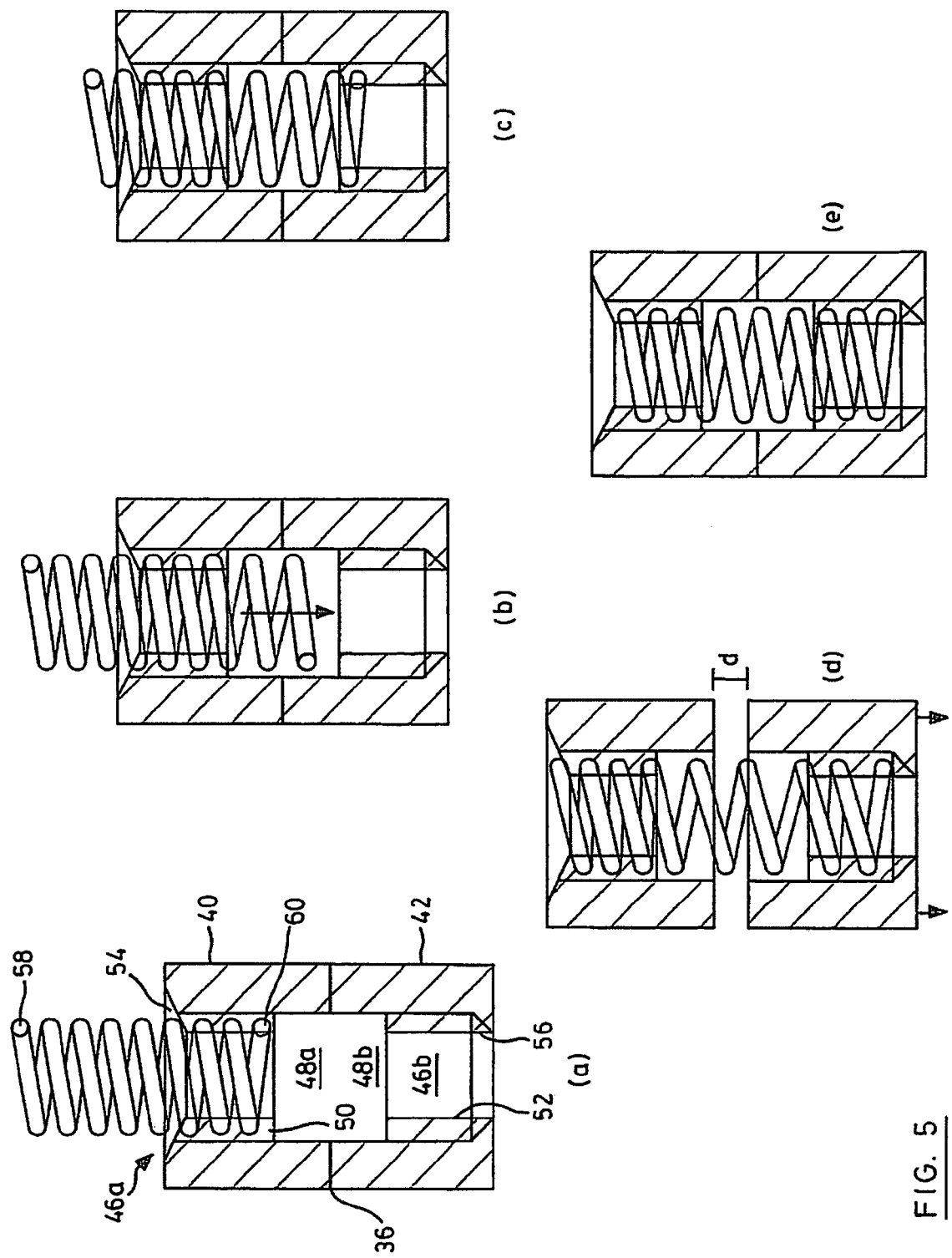
FIGS. 5a-5e show a series of steps in assembling the rimlock of FIG. 4.

Referring therefore to FIG. 5a, to insert the spring 44, it is rotated as it is brought towards the bevel 54 such that the lower end 60 begins threading through the step 50. The spring 44 may cut a thread as it turns, or a thread may already exist. This rotation continues as the lower end 60 reaches the interface of the smaller bore 46a and the larger bore 48a. The remainder of the spring 44 as it passes through the upper abutment 40 will maintain a consistent helical shape since the spring 44 will follow the threads travelled by the lower end 60.

Referring to FIG. 5b, the spring 44 continues to thread through the upper abutment 40, until its lower end 60 reaches the interface of the larger bore 48b and smaller bore 46b in the abutment 42. At this stage, the portion of the spring 44 that lies within the larger bores 48a and 48b will typically be in a free body state as it exits step 50. As shown in FIG. 5c, the spring 44 continues to turn until it begins to engage and thread into step 52. Preferably, the spring 44 should engage approximately 1/10 to 1/5 of the axial length of step 52 in order to provide a sufficient grip between the spring 44 and the abutment 42.

Referring now to FIG. 5d, the abutments 40 and 42 are then separated a distance d and held in such a separated arrangement while the spring 44 continues to thread through step 52. Accordingly, one rotation of spring 44 moves the lower end 60 further than the upper end 58 and stretches the spring 44 in its central portion, which induces a tension in the portion of the spring 44 that lies within the larger bores 48a and 48b. Once the spring 44 has threaded through both steps 50 and 52, two fixed endpoints are thus created, namely at the interfaces of the larger bores 48a and 48b and the smaller bores 46a and 46b and the spring 44 is in tension therebetween. The tension in spring 44 between the fixed endpoints then causes the abutments 40 and 42 to engage when released as shown in FIG. 5e.

The spring 44 therefore tends to pull its lower end 60 and upper end 58 towards each other which subsequently brings the upper abutment 40 into engagement with the lower abutment 42. The spring 44 may be pulled further into tension when the rimlock 24 is pulled apart to allow the interchange of lenses, and will snap back into the position illustrated in FIG. 5e and schematically in FIG. 1, upon release of the rimlock 22 or 24.

The separation d between the abutments 40 and 42 used to create tension in spring 44 may vary depending on the size of the rimlock 24. It has been found that a separation in the range of 0.5 mm to 2 mm for a typical implementation will suffice and the exact separation will depend on the chosen sizes for abutments 40 and 42. Preferably, the material used for creating steps 50 and 52 permit the spring 44 to cut its own thread as it turns through the abutments 40 and 42, and provides sufficient resistance to maintain the ends 58 and 60 of the spring 44 in their desired positions shown in FIG. 5e.

Alternatively, the spring 44 may sufficiently resist stretching such that in a free body state, it acts similar to a screw. Such a spring (not shown) could be threaded through the abutments 40 and 42 whilst they are engaged. Since the spring would resist stretching, it would contain enough holding force to maintain engagement of the abutments 40, 42 but would yield slightly when the abutments 40 and 42 are actively pulled apart to permit lens removal and insertion. Ultimately, the spring 44 should be assembled with the abutments 40, 42 such that a tension exists whereby as a result, the abutments 40 and 42 are held together unless actively pulled apart.

The lenses 14, 16 can therefore be changed quickly and easily by pulling open the rimlock 22 or 24, changing the lens 14 or 16, and releasing the rimlock 22 or 24 causing it to snap back around the lens 14 or 16 to place it into its desired position. The spring 44 will maintain engagement of the upper abutment 40 and lower abutment 42 without the need to tighten a screw or other fastener. The rimlock's parts 44, 40, 42 remain assembled during use and therefore reduce the risk of losing valuable parts of the eyeglass 10.

Although the invention has been described with reference to certain specific embodiments, various modifications thereof will be apparent to those skilled in the art without departing from the spirit and scope of the invention as outlined in the claims appended hereto.

What is claimed is:

1. A lens clamping device for an eyeglass frame for holding a lens in place within said frame, said device comprising a pair of abutments on opposite sides of a discontinuity of said frame, said abutments having a bore passing therethrough, said abutments biased into engagement by a spring located in said bore wherein a portion of said spring within said bore is in tension to bias said abutments into engagement, wherein each said abutment comprises a smaller axial bore passing therethrough and a larger axial bore passing through a portion thereof to define a collar of material, said larger bores arranged adjacent one another and said collars arranged remote one another, said spring threading through each said collar to grip said abutments, said portion of said spring in tension between respective collars, and wherein said spring permits said lens to be removed by separation of said abutments.

2. A device according to claim 1 wherein one of said abutments comprises a bevel about the circumference of its smaller bore to encourage threading of said spring into said smaller bore.

3. A device according to claim 1 wherein each said larger bore is approximately one third of the axial length of its respective abutment.

4. A device according to claim 1 wherein said device comprises a total axial length in the range of 3 mm to 10 mm.

5. A device according to claim 4 wherein said length is in the range of 3 mm to 4 mm.

6. A device according to claim 1 wherein said abutments comprise an equal axial length.

7. An eyeglass device comprising the lens clamping device according to claim 1.

* * * * *